United States Patent [19]

Leonhardt et al.

[11] Patent Number: 5,293,285

[45] Date of Patent: Mar. 8, 1994

[54] APPARATUS AND MEDIA FOR RECORDING DATA ON TWO SIDES OF A MAGNETIC TAPE

[75] Inventors: Michael L. Leonhardt, Longmont; Hartvig E. Melbye, Boulder, both of Colo.

[73] Assignee: Storage Technology Corporation, Louisville, Colo.

[21] Appl. No.: 891,778

[22] Filed: Jun. 1, 1992

[51] Int. Cl.⁵ ............................................. G11B 15/43
[52] U.S. Cl. ................................. 360/95; 360/130.21
[58] Field of Search ..................... 360/90, 93, 95, 104, 360/105, 130.21

[56] References Cited

U.S. PATENT DOCUMENTS

| | | | |
|---|---|---|---|
| 3,507,436 | 4/1970 | Webb | 360/130.21 |
| 4,563,717 | 1/1986 | Fleek et al. | 360/95 |
| 4,603,360 | 7/1986 | Fujiki et al. | 360/95 |
| 4,800,450 | 1/1989 | Rodal et al. | 360/95 |
| 4,860,134 | 8/1989 | Hashimoto | 360/95 |
| 4,970,612 | 11/1990 | Renders et al. | 360/95 |
| 4,974,101 | 11/1990 | Sturm et al. | 360/90 |
| 4,991,038 | 2/1991 | Grant et al. | 360/95 |
| 5,173,828 | 12/1992 | Tanzer et al. | 360/130.21 |

FOREIGN PATENT DOCUMENTS 1340451 9/1963 France .................... 360/95

*Primary Examiner*—John T. Kwon
*Attorney, Agent, or Firm*—Duft, Graziano & Forest

[57] ABSTRACT

The data recording system writes data on both sides of a two sided magnetic recording tape, in directions of magnetization that are angular displaced with respect to each other, to reduce the effects caused by contact recording and magnetic print through. The media used for the magnetic tape consists of a standard mylar substrate to which a coating of magnetic recording materials is applied, on both sides thereof. In order to reduce the effect of magnetic print through and contact recording, the particles or films that are applied to both sides of the substrate are oriented in differing magnetic orientations that are angularly displaced with respect to each other and two sets of read/write heads are used. The read/write heads can be oriented to produce magnetic fields on one side of the magnetic tape that are angularly displaced with respect to the magnetic fields created on the other side of the magnetic tape. In one embodiment, the azimuth angles of the two read/write heads are selected to be angularly displaced with respect to each other in two dimensions, coplanar with the recording surface of the magnetic tape.

33 Claims, 4 Drawing Sheets

APPARATUS AND MEDIA FOR RECORDING DATA ON TWO SIDES OF A MAGNETIC TAPE

FIELD OF THE INVENTION

This invention relates to magnetic recording and, in particular, to apparatus and media for recording data on both sides of a two sided magnetic tape.

PROBLEM

It is a problem in the data processing industry to store the maximum amount of data on the minimum volume of media. Magnetic recording tape is commonly used as the media of choice since it is inexpensive and yet provides a significant data storage capacity per unit volume. Improvements in magnetic recording technology have increased the track density as well as the bit recording density for magnetic tape in order to maximize the number of bits stored per square inch of magnetic tape. Further improvements in the recording density of magnetic tape are increasingly difficult to attain due to the need for accurate alignment of the magnetic tape with the read/write head to read the data from the plurality of tracks written on the magnetic tape. Any misalignment of the tracks of the magnetic tape with the read/write head causes errors in the data read from the magnetic tape. In addition, the increase in linear recording density is restricted by the bandwidth of the recording channel.

Two sided magnetic tape has been proposed in the past but has been found to be impractical for a number of reasons. One problem with two sided magnetic tape is the phenomena of print through, wherein the data written on the media located on one side of the magnetic tape effects the magnetization of the media located on the other side of the magnetic tape. The use of a thicker media reduces the print through phenomena but it also reduces the volumetric storage capacity of the magnetic tape. The phenomena of contact recording can also be a problem, wherein the magnetic tape, when wound on the reel, places the magnetic media of one side of the magnetic tape physically against the magnetic media of the other side of the magnetic tape, as contained on the previous wrap of magnetic tape on the reel. Thus, the entire length of two sided magnetic tape, when wound onto the tape reel, has the media of both recording surfaces physically juxtaposed to other recording surfaces, and the physical contact therebetween can cause errant magnetization of the media. Further, the use of long wavelengths to write data on the magnetic tape augments print through and aggravates contact recording. Therefore, two sided magnetic tape has not been used in the data processing industry since these phenomena cause unacceptable levels of errors in reading and writing data onto this media.

SOLUTION

The above described problems are solved and a technical advance achieved in the field by the apparatus and media for recording data on two sides of a magnetic tape. The data is written on both sides of the magnetic recording tape in directions of magnetization that are of sufficient angular displacement to each other to reduce the effects of contact recording and magnetic print through. The media used for this magnetic tape could consist of a mylar substrate to which a coating of magnetic recording material is applied, on both sides thereof. Therefore, the resultant magnetic tape has two recording surfaces, one on either side of the mylar substrate. Data is written on both the front and the back of this magnetic tape to double the data density of this magnetic tape with respect to conventional one sided magnetic tape media.

In order to reduce the effect of magnetic print through and contact recording, the magnetic particles or films that are applied to both sides of the substrate are oriented in differing magnetic orientations. The magnetic orientations are of sufficient angular displacement to minimize the effects of these two phenomena. The media orientations can be coplanar with the recording surface of the magnetic tape (x and y axis) or perpendicular to the recording surface (z axis) of the magnetic tape or vector combinations thereof. The greater the angular disparity between magnetic orientations on the two sides of the magnetic recording tape, the lesser the possibility of magnetic print through or contact recording.

The tape drive can include two sets of read/write heads, with one set of read/write heads being located on each of the two sides of the magnetic tape as it travels through the tape path in the tape drive. The two sets of read/write heads concurrently read/write data on their respective sides of the magnetic tape thereby operating at twice the data transfer rate of a single read/write head tape drive. Alternatively, the data can be written at the data transfer rate of a single read/write head by successively activating the two read/write heads to write data first on one side of the magnetic tape then on the other side of the magnetic tape. To minimize print through and contact recording effect during write and/or read operations, each of two sets of read/write heads are oriented to generate read/write magnetic fields on one side of the magnetic tape that are angularly displaced with respect to the generated read/write magnetic fields on the other side of the magnetic tape. In one embodiment, the azimuth angles of the two read/write heads are selected to be angularly displaced with respect to each other in two dimensions, coplanar with the recording surface of the magnetic tape.

DETAILED DESCRIPTION

Figure 1:
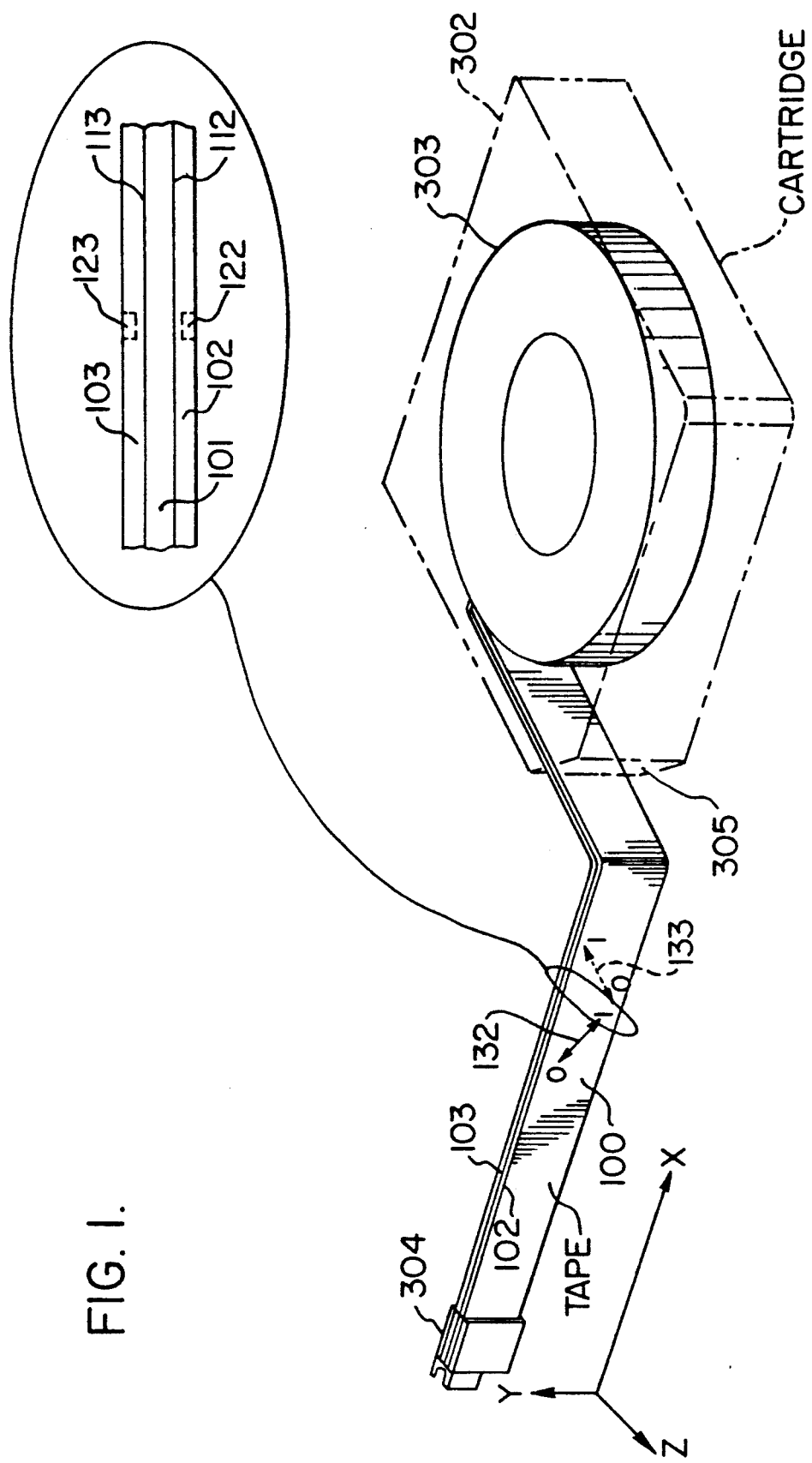
FIG. 1 illustrates the magnetic tape having magnetic orientations in planar directions that are angularly displaced with respect to each other.

In data processing systems, a commonly used data storage media is the magnetic recording tape. A popular industry standard form of this magnetic recording tape is the 3480-type magnetic tape cartridge 302 (FIG. 1) which uses a ½-inch magnetic tape 100 wound on a single reel 303 that is rotatably mounted within the magnetic tape cartridge 302. One end of the magnetic tape 100 is affixed to a leader block 304, which is positioned juxtaposed to an opening 305 in one corner of the magnetic tape cartridge 302 when the tape is rewound on reel 303 to enable a tape threading arm (not shown)

in an associated drive element to extract the leader block 304 and the attached magnetic tape 100 from the magnetic tape cartridge 302. The tape threading arm guides the magnetic tape 100 via the leader block 304 through the tape path in the tape drive mechanism to thread the leader block 304 and the end of the magnetic tape 100 onto a drive reel (not shown) contained within the tape drive mechanism.

Two Sided Magnetic Recording Tape

Figure 2:
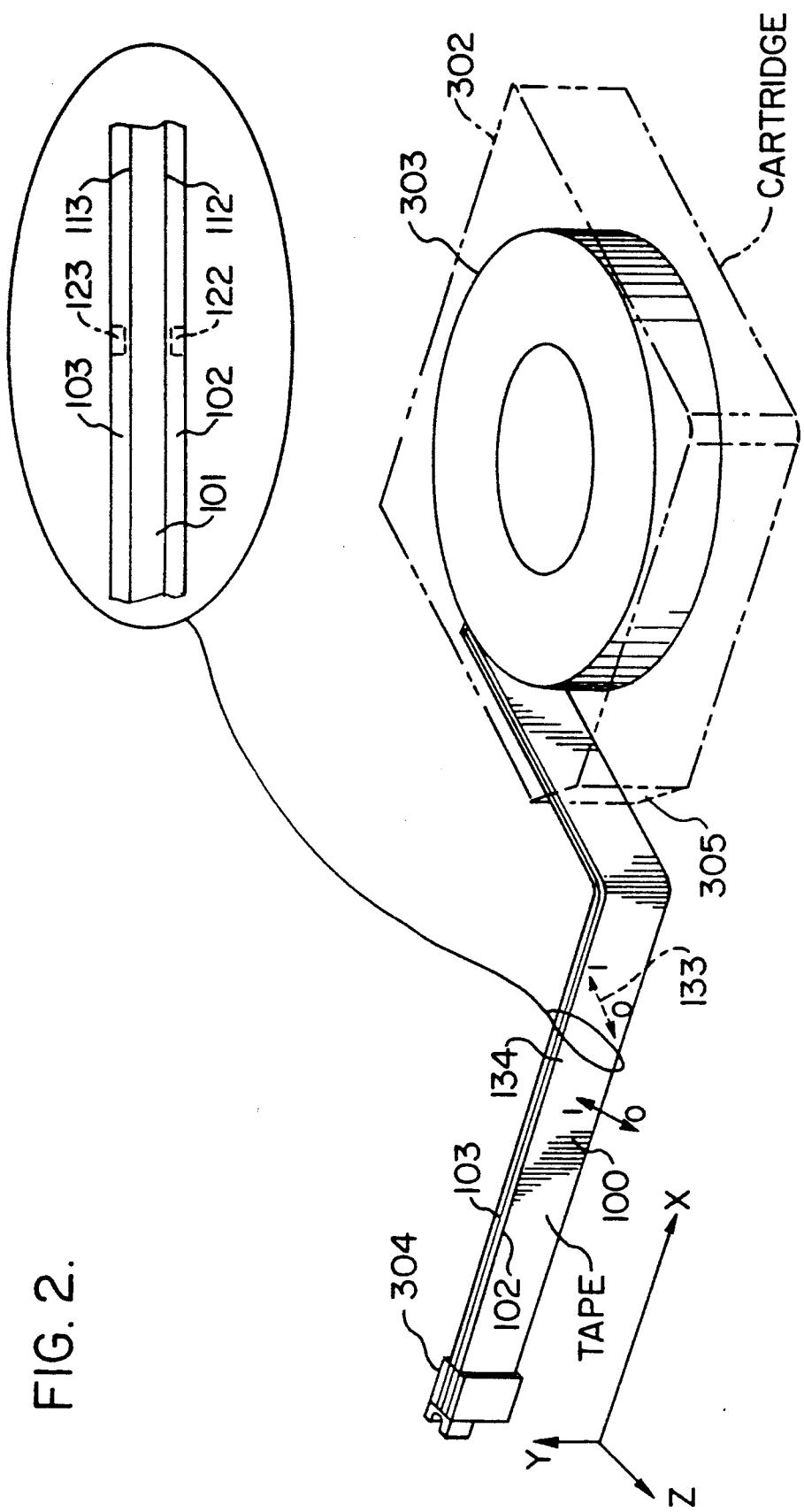
FIG. 2 illustrates magnetic recording tape having magnetic orientations that are angularly displaced from each other in directions that are perpendicular to the surface of the recording tape.

FIGS. 1 and 2 illustrate both a perspective view and a cross sectional view of the two sided magnetic recording tape 100 to illustrate the orientation of the magnetic domains in the magnetic material contained therein. In both of these figures, a set of Cartesian coordinate axes are provided to simplify the description of the magnetic orientation. Magnetic recording tape 100 can consist of a mylar substrate 101 on which has been deposited two recording surfaces, consisting of a first layer of magnetic material 102 on a first side 112 of the substrate 101 and a second layer of magnetic material 103 on a second side 113 of the substrate 101. The magnetic material used in the first 102 and second 103 layers is of standard composition and, in the presence of an applied magnetic field during the manufacturing process, the magnetic particles contained in the magnetic material are oriented in one of two preferred orientations 132, 133, respectively. During the write process the regions of magnetization 122, 123 typically formed in magnetic recording tape 100 do not extend completely through the layers 102, 103 of recording material. The regions of magnetization 122, 123 only partly penetrate layers 102, 103, respectively and typically do not reach substrate 101.

The magnetic tape 100 is positioned in FIG. 1 such that the plane formed by the x and y axes is coplanar with the recording surfaces of the magnetic recording tape 100. In one possible configuration, the magnetic orientations 132, 133 of the magnetic particles or films in both of the layers 102, 103 of magnetic material are solely aligned in the plane formed by the x and y axes, that is, coplanar with the recording surface of the magnetic recording tape 100. In order to minimize print through or contact recording, the orientation of the magnetic particles in the layer 102 of magnetic material on the front side 112 of the magnetic recording tape 100 is at a significant angular relationship to the orientation of the magnetic particles in the layer 103 of magnetic material on the back side 113 of the magnetic recording tape 100. Therefore, the two possible magnetic orientations of the magnetic particles in the layer 102 of magnetic material on the front side 112 of the magnetic recording tape 100, corresponding to a binary 0 or 1, are oriented opposite to each other and, at the same time, are angularly displaced with respect to the two magnetic orientations of the magnetic particles in the layer 103 of magnetic material on the back side 113 of the magnetic recording tape 100 which correspond to a digital 0 or 1 recorded thereon. In reading the data from this two sided magnetic recording tape 100, the effects of contact recording or print through are minimal due to the angular displacement of the magnetic media on the front 112 and back 113 sides of the magnetic recording tape 100. Furthermore, any print through or contact recording that does occur is likely to be substantially ignored by the read/write heads 142-145 shown on FIGS. 3 and 4 since this errant magnetization would occur in a direction that is angularly displaced with respect to the preferred direction of magnetization for a binary 0 or 1 bit on that side of the magnetic tape 100.

FIG. 2 illustrates the magnetic orientation of the magnetic particles in a z axis direction in the layer 102 of magnetic material which orientation is substantially perpendicular to the recording surface of the magnetic recording tape 100. This is an alternative configuration of magnetization that is orthogonal to magnetic orientations 132, 133 and it is obvious that, in a three dimensional Cartesian coordinate system, magnetization along any two axes within this three dimensional system, minimizes the effects of contact recording and print through. It is also envisioned that any arbitrary pair of vectors, one used as the preferred direction of magnetization for the front side 112 of the magnetic recording tape 100 and the other used as the preferred direction of magnetization for the back side 113 of the magnetic recording tape 100, are similarly effective as long as these two vectors are at a significant angle with respect to each other in three dimensions such that each of read/write heads 142-145 are relatively insensitive to errant magnetization in the other direction of magnetization as the data is written on the opposite side of the magnetic tape from the read/write head 142-145.

Magnetic Domain Misalignment and Read/Write Head Separation

As noted above, the greater the angular disparity between the magnetic orientations of the media 102, 103 on both sides 112, 113 of the magnetic tape 100, the lesser the possibility of magnetic print through or contact recording. This is due to the fact that the read/write heads 142-145 are oriented in an azimuth angle to match the desired magnetic orientation of the data on magnetic tape 100. Any errant magnetization due to print through or contact recording would be at a significant angular displacement from the azimuth angle of the read/write heads 142-145 and therefore attenuated by this angular displacement.

$$\text{Attenuation factor} = \frac{\sin\left(\frac{\pi w \tan \alpha}{\lambda}\right)}{\left(\frac{\pi w \tan \alpha}{\lambda}\right)}$$

where:
 w = track width
 $\lambda$ = wavelength of recorded data
 $\alpha$ = misalignment of azimuth angle Increased angular displacement of the read heads 142, 144 from the recorded magnetization produces diminished magnitude read signals.

In similar fashion, the effects of media thickness can be precisely determined. The greater the thickness of the media 102, 103, the greater the separation between the read/write heads 142, 143/144, 145 and the magnetization of the media 102/103 on the opposite side 112/113 of magnetic tape 100. This relationship can be expressed as:

$$\text{Attenuation factor} = e^{-2\pi T/\lambda}$$

where
 T = separation (media thickness)
 $\lambda$ = wavelength of recorded data Thus, an increase in the media thickness and/or the angular displacement between read/write heads and magnetic orientations on the other side of magnetic tape 100 results in a reduction of the effects of print through and contact recording phenomena.

Tape Drive Apparatus

Figures 3, 4:
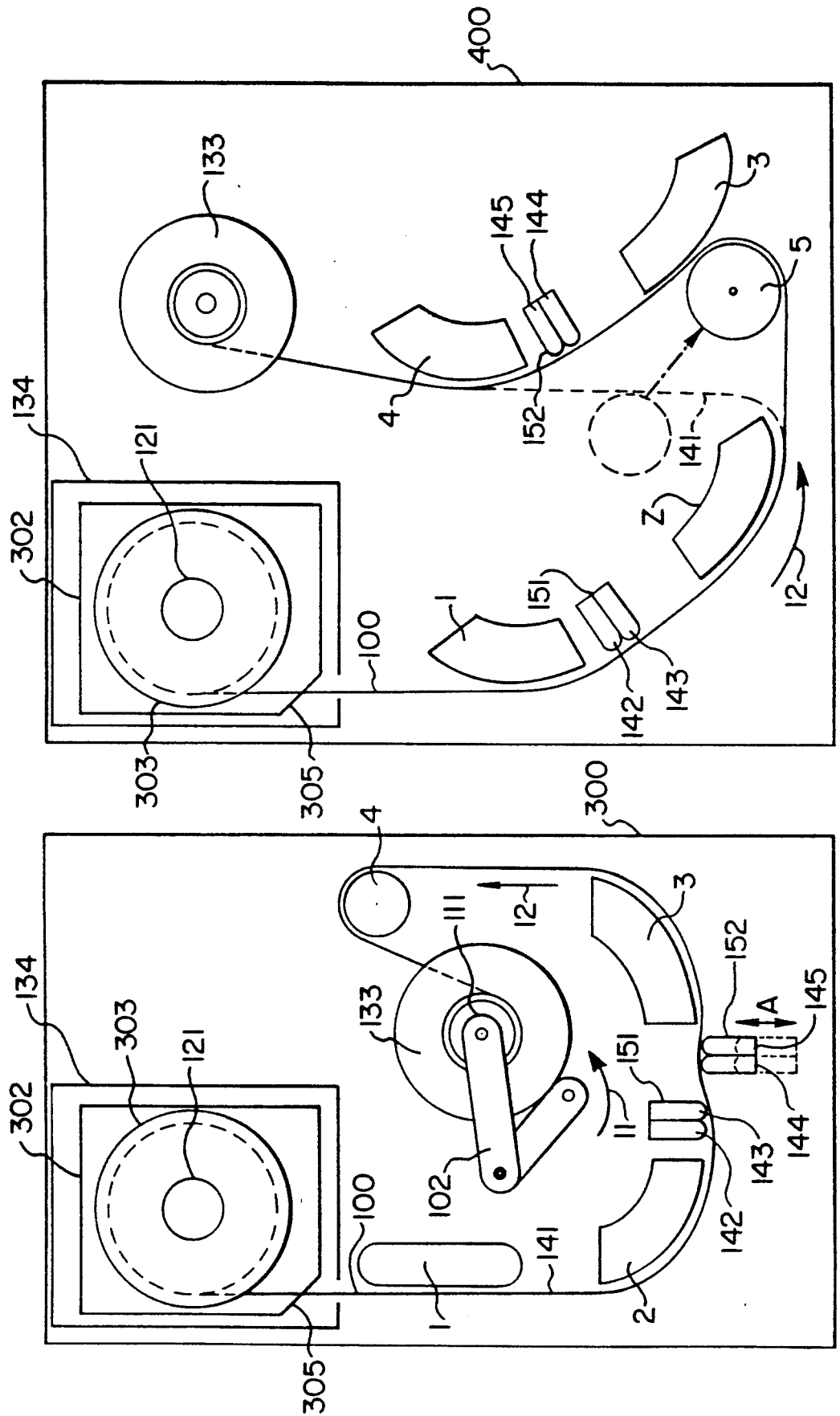
FIGS. 3 and 4 illustrate a drive mechanism having two read/write heads.

FIG. 3 illustrates the mechanical configuration of a tape drive apparatus 300 that can be used to read and write data on two sided magnetic recording tape 100. The apparatus illustrated in FIG. 3 is similar to a 3480-type form factor magnetic tape drive apparatus. A tape elevator (not shown) or cartridge slot 134 is used to accept the 3480-type magnetic tape cartridge 302. A tape threading arm 102 is used to grasp the leader block 304 from the tape cartridge 302 and thread the leader block 304 and the magnetic tape 100 attached thereto along tape threading path 141 to takeup reel 133. A plurality of guides 1–4 are used along tape path 141 to guide the positioning of the magnetic tape 100 along tape path 141. The tape threading arm 102 rotates in the direction indicated by arrow 11 and the magnetic tape 100 is threaded along tape threading path 141 in the direction indicated by arrow 12. Along this tape threading path 141 and between guides 2 and 3 are located two sets of read/write heads 142–145, comprising a read head 143 and a write head 142 for the first set of read/write heads 151 and read head 145 and write head 144 for the second set of read/write heads 152. The two sets read/write heads 151, 152 are positioned on opposite sides of the tape threading path 141 and located substantially adjacent to each other in the preferred embodiment in order to concurrently read and write data on to both sides 112, 113 of the magnetic recording tape 100. A takeup reel motor 111 is used to drive takeup reel 133 and a supply reel motor 121 is used to drive the reel 303 contained in the magnetic tape cartridge 302 that is inserted into tape slot 134.

In order to permit tape threading arm 102 to transport leader block 304 along tape threading path 141 between the first set of read/write heads 151 and the second set of read/write heads 152, one of the two sets of read/write heads 151, 152 can be moveable to permit leader block 304 to pass. Tape drive 300 illustrates a possible configuration where the second set of read/write heads 152 is moveable in direction A between a first position (illustrated in dotted line form) that enables leader block 304 to pass along tape threading path 141 between second set of read/write heads 152 and tape guide 3 during the tape threading operation and a second position (illustrated in solid line form) that provides contact between magnetic tape 100 and the second set of read/write heads 152 for data read/write operations.

It should be noted that although simultaneous use of the two sets of read/write heads 151, 152 is described, the sequential use of the two sets of read/write heads 151, 152 is possible by either simply rewinding magnetic tape 100 into magnetic tape cartridge 302 once data is written in a first direction on one side of magnetic tape 100 and then writing data in the same direction on the other side of magnetic tape 100 or write data on the other side of magnetic tape 100 in the opposite direction once the end of magnetic tape 100 is reached.

Alternate Tape Drive Apparatus

There are many possible configurations of read/write heads 142–145 possible in a tape drive to simultaneously read/write data on both sides 112, 113 of a two sided magnetic tape 100. FIG. 4 illustrates an alternative configuration to that shown in FIG. 3. In particular, tape drive 300 uses a moveable set of read/write heads 152 while tape drive 400 has two fixed sets of read/write heads 151, 152. Tape drive 400 makes use of a moveable tape guide 5 to relocate magnetic tape 100 between tape threading path 141 and the tape read/write position against tape guide 3 and second set of read/write heads 152. Tape guide 5 is placed in the first position (illustrated in dotted line form) to enable leader block 304 and the attached magnetic tape 10 to traverse tape threading path 141 over tape guides 2, 5, 4 and into takeup reel 133. However, in this location, magnetic tape 100 does not contact the second set of read/write heads 152 or tape guide 3. Tape guide 5 is moveable, once the magnetic tape 100 is threaded through tape threading path 141, into a second position (illustrated in solid line form) to guide magnetic tape 100 into contact with tape guide 3 and the second set of read/write heads 152.

It is anticipated that numerous alternative embodiments of tape drives can be produced that use either moveable read/write heads or moveable tape guides or both. The tape drives 300, 400 illustrated in FIG. 3 and 4 are simply illustrative of the concepts of the invention and are not intended to limit the scope of the appended claims.

Head Alignment

Figure 6:
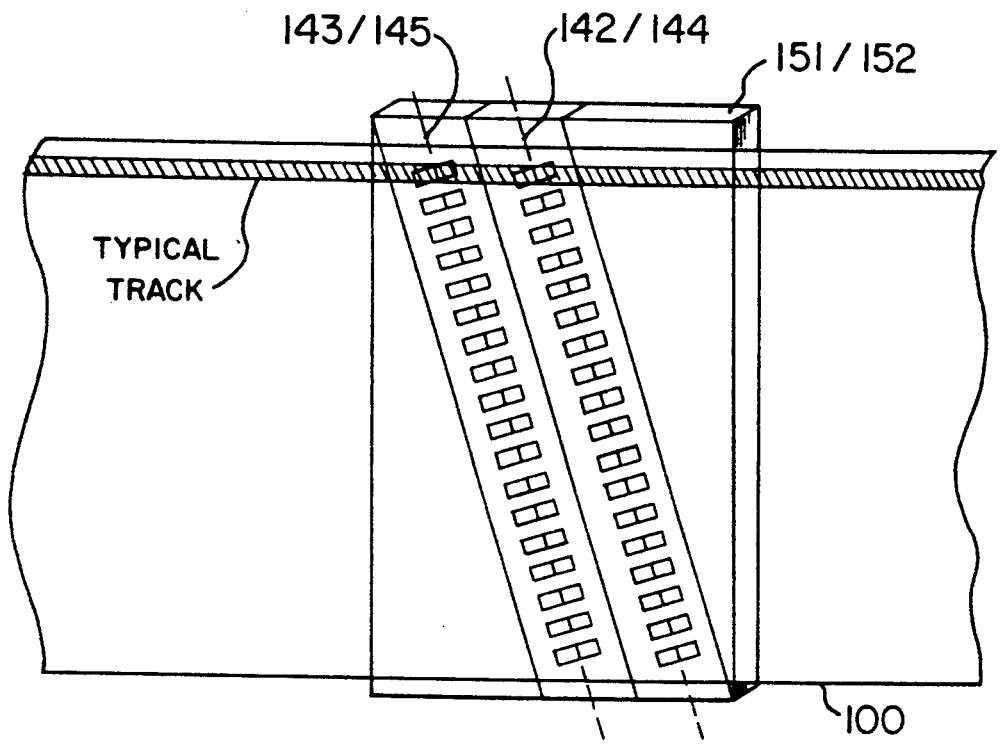
FIGS. 5 and 6 illustrate the azimuth orientation of the recording heads in the dual head tape drive.
Figure 5:
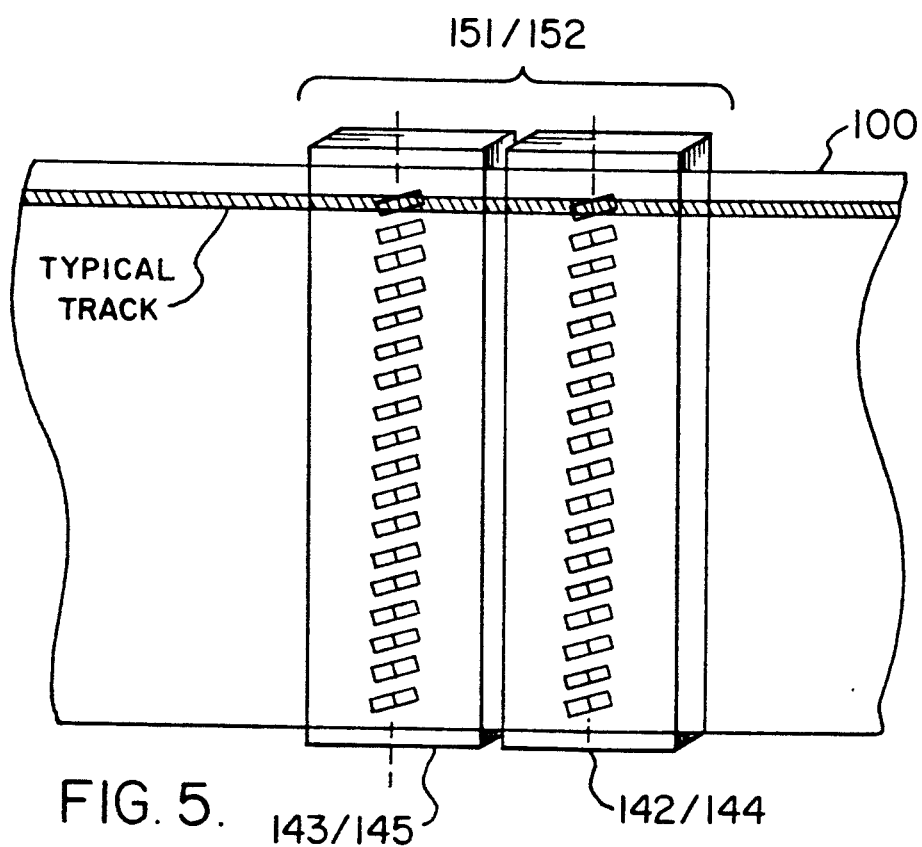

FIGS. 5 and 6 illustrate two configurations of the read/write heads 142–145 in order to indicate the alignment relationship therebetween and the azimuth alignment with magnetic tape 100. In order to maintain a substantial angular relationship between the data recorded on the first 112 and second 113 sides of the magnetic recording tape 100, the individual elements in the multitrack read/write head 142–145 for each of the two sets of read/write heads 151, 152, are arranged to align with the respective magnetic orientation 132, 133 of the first 102 and second 103 layers of magnetic materials of magnetic recording tape 100. Thus, the read/write elements in read/write heads 142, 143 are aligned to correspond to the magnetic orientation of the magnetic materials in layer 103 on the second side 113 of the magnetic recording tape. The read/write elements of the read/write heads 144, 145 are similarly aligned to correspond to the magnetic orientation of the layer 102 of magnetic materials on the first side 112 of the magnetic recording tape 100.

Each of read/write heads 142–145 consist of a stack of read/write elements. For an 18-track magnetic tape, read heads 143, 145 include 18 read elements that are spaced apart at regular intervals to span the width of magnetic tape 100. Similarly, write heads 142, 144 comprise 18 write elements that are spaced apart to match the spacing of the read elements in read heads 143, 145 so that each read element has a corresponding write element, both of which define a track of data on magnetic tape 100 The stack of read and write elements that comprise read heads 143, 145 and write heads 142, 144 can be stacked one directly above the next as shown in FIG. 5 or the entire stack can be skewed as shown in FIG. 6. In either of these approaches, the read and write elements can be integrated into a single head structure, as in FIG. 6, or utilized in separate head structures, as in FIG. 5. As an additional alternative, the read/write heads 142–145 can be configured from stacks of alternating read and write elements.

While specific embodiments of this invention have been disclosed, it is expected that those skilled in the art can and will design alternate embodiments of this invention that fall within the scope of the appended claims.

We claim:

1. A tape drive for reading/writing data on a two-sided magnetic recording tape having first and second recording surfaces, located on opposite sides, respectively, of said magnetic recording tape, wherein said magnetic recording tape is wound on a source reel, comprising:

takeup reel means for transporting said magnetic recording take from said source reel;

tape path means for guiding said magnetic recording tape along a tape path from said source reel to said takeup reel means;

first head means, having read/write elements for reading/writing data on said first recording surface of said two-sided magnetic tape, located juxtaposed to said tape path such that said read/write elements are proximate to said first recording surface of said magnetic recording tape when said magnetic recording tape is guided along said tape path;

second head means, having read/write elements for reading/writing data on said second recording surface of said two-sided magnetic tape, located juxtaposed to said tape path and on a side of said magnetic tape opposite from said first head means such that said read/write elements are proximate to said second recording surface of said magnetic recording tape when said magnetic recording tape is guided along said tape path; and wherein said read/write elements of said first head means and said second head means are oriented to create magnetic fields that are angularly displaced with respect to each other.

2. The tape drive of claim 1 wherein said first head means and second head means are located juxtaposed to said tape path such that said read/write elements of both said first head means and said second head means face said magnetic recording tape.

3. The tape drive of claim 1 wherein said first head means is located proximate to said second head means.

4. The tape drive of claim 3 wherein said read/write elements of both said first head means and second head means face said magnetic recording tape.

5. The tape drive of claim wherein said read/write elements of said first head means create magnetic fields that magnetically orient a region of said first recording surface along a first vector in a direction coplanar with said first recording surface.

6. The tape drive of claim 5 wherein said read/write elements of said second head means create magnetic fields that magnetically orient a region of said second recording surface along a second vector in a direction coplanar with said second recording surface.

7. The tape drive of claim 6 wherein said first and second vectors are angularly displaced with respect to each other.

8. The tape drive of claim 5 wherein said read/write elements of said second head means create magnetic fields that magnetically orient a region of said second recording surface along a second vector in a direction non-coplanar with said second recording surface.

9. The tape drive of claim 8 wherein said first and second vectors are angularly displaced with respect to each other.

10. The tape drive of claim 1 wherein said read/write elements of said first head means create magnetic fields that magnetically orient a region of said first recording surface in a direction along a first vector.

11. The tape drive of claim 10 wherein said read/write elements of said second head means create magnetic fields that magnetically orient a region of said second recording surface in a direction along a second vector.

12. The tape drive of claim 11 wherein said first and second vectors are angularly displaced with respect to each other.

13. The tape drive of claim 1 wherein magnetic recording tape is stored on said source reel in a cartridge housing and has a leader block attached to a first end of said magnetic recording tape, said tape drive further comprises:

tape threading means for transporting said leader block from said cartridge housing to said takeup reel means to wind said magnetic recording tape around said takeup reel means; and means for switching said second head means between a first position located juxtaposed to said tape path such that said read/write elements of said read/write head means are proximate to said second recording surface of said magnetic recording tape when said magnetic recording tape is guided along said tape path and a second position located a sufficient distance from said tape path to enable said leader block to traverse said tape path.

14. The tape drive of claim 13 further comprising:

means for activating said switching means to translate said second head means from said second to said first positions once said leader block has been transported substantially to said takeup reel means by said tape threading means.

15. The tape drive of claim 1 wherein said first head means and said second head means are simultaneously activatable to concurrently record data on both said first side and said second side of said magnetic tape recording tape.

16. The tape drive of claim 1 wherein said first head means and said second head means are sequentially activatable to sequentially record data on said first side and said second side of said magnetic recording tape.

17. A tape drive for reading/writing data on a two-sided magnetic recording tape having first and second recording surfaces, located on first and second sides, respectively, of said magnetic recording tape, wherein said magnetic recording tape is wound on a source reel, comprising:

takeup reel means for transporting said magnetic recording tape from said source reel;

tape path means for guiding said magnetic recording tape along a tape path from said source reel to said takeup reel means;

first head means, having read/write elements for reading/writing data on said first recording surface of said two-sided magnetic tape, located juxtaposed to said tape path such that said read/write elements of said first head means are proximate to said first recording surface of said magnetic recording tape when said magnetic recording tape is guided along said tape path;

second head means, having read/write elements for reading/writing data on said second recording surface of said two-sided magnetic tape, located juxtaposed to said tape path such that said read/- write elements of said second head means are proximate to said second recording surface of said magnetic recording tape when said magnetic recording tape is guided along said tape path;

wherein said read/write elements of said first head means and said second head means are oriented to create magnetic fields that are angularly displaced with respect to each other;

wherein said first head means is located proximate to said second head means and on opposite sides of said magnetic recording tape when said magnetic recording tape is guided along said tape path;

wherein said read/write elements of both said first head and said second head means face said magnetic recording tape;

wherein said read/write elements of said first head means create magnetic fields that magnetically orient a region of said first recording surface along a first vector in a direction coplanar with said first recording surface;

wherein said read/write elements of said second head means create magnetic fields that magnetically orient a region of said second recording surface along a second vector in a direction coplanar with said second recording surface; and wherein said first and second vectors are angularly displaced with respect to each other.

18. A tape drive system for reading/writing data on a two-sided magnetic recording tape having first and second recording surfaces, located on opposite sides, respectively, of said magnetic recording tape, wherein said magnetic recording tape is transported along a predetermined tape path in said tape drive system, said tape drive system comprising:

first head means, having read/write elements for reading/writing data on said first recording surface of said two-sided magnetic tape, and located juxtaposed to said tape path such that said read/write elements of said first head means are proximate to said first recording surface of said magnetic recording tape when said magnetic recording tape is guided along said tape path;

second head means, having read/write elements for reading/writing data on said second recording surface of said two-sided magnetic tape, and located juxtaposed to said tape path and on a side of said magnetic tape opposite from said first head means such that said read/write elements of said second head means are proximate to said second recording surface of said magnetic recording tape when said magnetic recording tape is guided along said tape path; and wherein said read/write elements of said first head means and said second head means are oriented to create magnetic fields for reading/writing data on said magnetic recording tape, which magnetic fields are angularly displaced with respect to each other.

19. The tape rive of claim 18 wherein said first head means and second head means are located juxtaposed to said tape path such that said read/write elements of both said first head means and said second head means face said magnetic recording tape.

20. The tape drive of claim 18 wherein said first head means is located proximate to said second head means.

21. The tape drive of claim 20 wherein said read/write elements of both said first head means and said second head means face said magnetic recording tape.

22. The tape drive of claim 18 wherein said read/write elements of said first head means create magnetic fields that magnetically orient a region of said first recording surface along a first vector in a direction coplanar with said first recording surface.

23. The tape drive of claim 22 wherein said read/write elements of said second head means create magnetic fields that magnetically orient a region of said second recording surface along a second vector in a direction coplanar with said second recording surface.

24. The tape drive of claim 23 wherein said first and second vectors are angularly displaced with respect to each other.

25. The tape drive of claim 23 wherein said read/write elements of said second head means create magnetic fields that magnetically orient a region of said second recording surface along a second vector in a direction non-coplanar with said second recording surface.

26. The tape drive of claim 25 wherein said first and second vectors are angularly displaced with respect to each other.

27. The tape drive of claim 18 wherein said read/write elements of said first head means create magnetic fields that magnetically orient a region of said first recording surface in a direction along a first vector.

28. The tape drive of claim 27 wherein said read/write elements of said second head means create magnetic fields that magnetically orient a region of said second recording surface in a direction along a second vector.

29. The tape drive of claim 28 wherein said first and second vectors are angularly displaced with respect to each other.

30. The tape drive of claim 18 wherein said tape drive further comprises:

tape threading means for transporting said leader block along said tape path prior to reading/writing data thereon; and means for switching said second head means between a first position located juxtaposed to said tape path such that said read/write elements of said second head means are proximate to said second recording surface of said magnetic recording tape when said magnetic recording tape is guided along said tape path and a second position located a sufficient distance from said tape path to enable said tape threading means to traverse said tape path.

31. The tape drive of claim 30 further comprising:

means for activating said switching means to translate said second head means from said second position to said first position once said tape threading means has substantially traversed said tape path.

32. The tape drive of claim 18 wherein said first head means and said second head means are simultaneously activatable to concurrently record data on both said first side and said second side of said magnetic recording tape.

33. The tape drive of claim 18 wherein said first head means and said second head means are sequentially activatable to sequentially record data on said first side and said second side of said magnetic recording tape.

* * * * *